United States Patent
Cherkasova et al.

(10) Patent No.: US 8,321,644 B2
(45) Date of Patent: *Nov. 27, 2012

(54) BACKING UP FILESYSTEMS TO A STORAGE DEVICE

(75) Inventors: Ludmila Cherkasova, Sunnyvale, CA (US); Roger K T Lau, Sunnyvale, CA (US); Harald Burose, Gaufelden (DE); Bernhard Kappler, Herrenberg BW (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/571,823

(22) Filed: Oct. 1, 2009

(65) Prior Publication Data

US 2011/0082972 A1    Apr. 7, 2011

(51) Int. Cl.
*G06F 12/16* (2006.01)
*G06F 12/00* (2006.01)

(52) U.S. Cl. ............ 711/162; 711/111; 711/E12.103; 711/E12.001

(58) Field of Classification Search .............. None
See application file for complete search history.

(56) References Cited

U.S. PATENT DOCUMENTS

| | | | |
|---|---|---|---|
| 7,930,559 B1 * | 4/2011 | Beaverson et al. | 713/193 |
| 2008/0244601 A1 * | 10/2008 | Zeis et al. | 718/104 |
| 2011/0082837 A1 * | 4/2011 | Cherkasova et al. | 707/654 |
| 2011/0202504 A1 * | 8/2011 | Cherkasova et al. | 707/654 |
| 2011/0295811 A1 * | 12/2011 | Cherkasova et al. | 707/654 |

* cited by examiner

*Primary Examiner* — Denise Tran

(57) ABSTRACT

A method, a tangible non-transitory computer readable storage medium, and a tape library for backing up filesystems are provided. Historic job durations to back up data to a storage device are obtained. Objects to be backed up to multiple drives in the storage device are ordered based on the job durations. The objects are assigned to agents based on priorities that first back up an object having a longest job duration. The objects are backed up with the agents to the multiple drives according to the priorities.

19 Claims, 8 Drawing Sheets

600

| Backup Server | Absolute and Relative Reduction of the Overall Backup Time | | |
|---|---|---|---|
| | Week 1 | Week 2 | Week 3 |
| Server 1 | 211 min (20%) | 208 min (22%) | 185 min (19%) |
| Server 2 | 78 min (9%) | 77 min (9%) | 53 min (6%) |
| Server 3 | 39 min (5%) | 39 min (5%) | 41 min (5%) |
| Server 4 | 89 min (25%) | 99 min (26%) | 96 min (23%) |
| Server 5 | 203 min (29%) | 212 min (30%) | 202 min (29%) |
| Server 6 | 146 min (26%) | 145 min (25%) | 149 min (21%) |
| Server 7 | 49 min (5%) | 48 min (5%) | 49 min (5%) |

FIG. 6

BACKING UP FILESYSTEMS TO A STORAGE DEVICE

BACKGROUND

Unstructured data is a large and fast growing portion of assets for companies and often represents 70% to 80% of online data. Analyzing and managing this unstructured data is a high priority for many companies. Further, as companies implement enterprise-wide content management (such as information classification and enterprise search) and as the volume of data in the enterprises continues to increase, establishing a data management strategy becomes more challenging.

Backup management also faces challenges to manage large amounts of unstructured data. Backup systems are required to process increasing amounts of data while meeting time constraints of backup windows.

BRIEF DESCRIPTION OF THE DRAWINGS

FIG. 6 shows a table that provides reductions in backup times when the LBF algorithm is applied to backup data in accordance with an example embodiment of the present invention.

DETAILED DESCRIPTION

Figure 1:
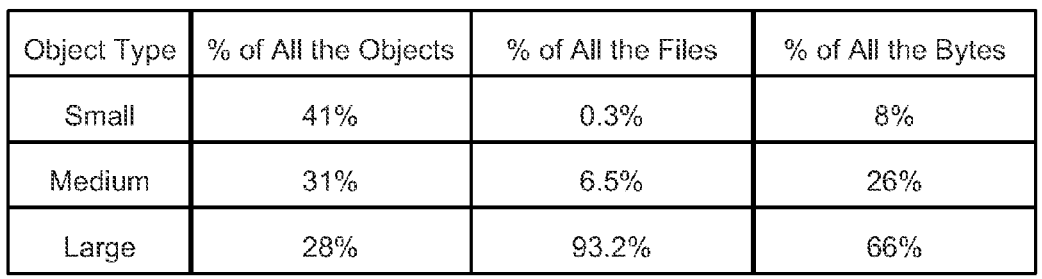
FIG. 1 shows a table that summarizes data for filesystems backed-up over time in accordance with an example embodiment of the present invention.

Example embodiments relate to enhancing and optimizing data protection solutions for backing up data, such as large amounts of unstructured data occurring in filesystems. With example embodiments, a time to backup data is reduced when compared with backing up data using random job scheduling.

As filesystems are backed up over time, a time or duration to backup each filesystem is stored as part of historical information. This information is used to schedule and prioritize future backups so the filesystems are backed up with an optimal or reduced overall time. The information is also used to reduce interleaving of data across multiple disks. Filesystems with longer running backup times are scheduled and commenced first, while filesystems with shorter backup times are subsequently commenced. A sequence determines when a filesystem will commence backup when compared to other filesystems also awaiting backup. This sequence or ordering is based on a previous length of time to backup each filesystem. As such, example embodiments determine an optimal ordering to backup multiple filesystems to one or more storage devices.

One embodiment uses historic information about prior object backup processing times and generates a job scheduling that reduces an overall time to backup data. Under this scheduling, the longest backups (the objects with longest backup time) are scheduled first (referred to herein as longest backups first or LBF).

One embodiment provides a framework to utilize an existing backup infrastructure of an enterprise by integrating additional content analysis routines and extracting already available filesystem metadata over time. This framework is used to perform data analysis and data trending that assists in adding performance optimization and self-management capabilities to backup data and perform other management tasks.

Overview

As discussed more fully below, example embodiments analyze historical patterns and behaviors of an enterprise's data to identify trends and more efficiently manage the data (for example, designing and configuring the resources and application constraints that IT professionals deal with, such as, application consolidation, resource allocation, storage sizing, quota management, backup system configuration, reducing backup time, etc.).

Example embodiments use a historical summary of metadata to solve capacity planning problems, optimize backup schedules, and determine resource allocation tasks. For example, software tools are used to capture metadata of each backup period and used to provide data points for initial metadata analysis and trending. The backup infrastructure is an example location to integrate additional content analysis routines as well as to extract already available filesystem metadata and perform data analysis using historical filesystem snapshots. For example, having visibility into the location of files in the corporate network and machines is useful in legal cases. Using the backup catalogue to prove which user had access at which time to a file and who had a copy on their desktop or laptop computer can be determined. Understanding the type of data located on a computer could also be used as a trigger of further investigating data on a specific computer and performing additional content analysis of the data. Analyzing the metadata allows the identification of a suspect system and triggering a restore of old data to a temporary (potentially even virtual system) for the analytics to run without the employee noticing.

Random job scheduling for backups can lead to inefficient backup processing and an increased backup time. To avoid this inefficiency, example embodiments use historic information about the object backup processing time and suggest a job scheduling that uses LBF, where the objects with longest projected backup time are scheduled first.

In one performance study, a workload was collected from seven backup servers. Example embodiments achieved a time savings (40 minutes to 212 minutes) under a job scheduling that used LBF for all seven backup servers. The reduction of the backup time (5%-30%) depends on the size distribution of objects for which the backup server is responsible. When a backup server has a significant portion of objects with a long processing time, the proposed new job scheduling is especially efficient and provides significant backup time reduction.

Framework for Assessing Dynamics of Enterprise Information Assets

To provide a "first-approximation" summary of unstructured information assets and their trends over time in the enterprise, example embodiments use historical data available from backup databases. Companies now store months to years of backup metadata online in order to provide the ability to quickly find and recover files when they are needed. In this way, existing backups already capture business-critical data and their evolution over time. Backup tools and utilities, however, are not designed to support file reporting and their metadata analysis, classification, aggregation, and trending over time. Example embodiments extend functionality of the backup tools to provide valuable data and metadata analysis services in an automated, representative, and fast manner.

Conceptually, backup tool functionality is built around the backup session and the objects (mount points or filesystems) that are backed up during the session. In many systems, there is no direct and simple way to retrieve only the file metadata for the entire filesystem and to perform a specific analysis of these data over time. To extract the snapshot of filesystem metadata at a particular moment of time, one performs a sequence of steps to retrieve a filesystem catalogue.

This procedure might take several hours for a large collection of files (e.g., 1,000,000 files or more), which makes the whole process inefficient (time- and space-wise) when such snapshots are extracted for analysis, building statistics and trends over longer durations of 6-18 months. The existing data structures in the backup database do not support this large-scale metadata retrieval and data analysis.

Example embodiments create representative, complementary filesystem metadata snapshots during the backup sessions. The format of such snapshots is specifically designed to derive detailed statistics and trends. Furthermore, these snapshots are further folded into a compact filesystem metadata summary that uniquely reflects filesystem evolution and dynamics over time.

Under this approach, there is an entry with metadata for each file, link, or directory. This data includes permissions of a file, owner, group, ACLs, size, date, time, and a file name (with a full path). The entries are sorted in by the file name. Additionally, there is a field in each entry that represents a timestamp of the backup, denoted as the backup_id.

When the next snapshot is generated for the same filesystem (for example, a week later), the snapshots are combined. Specifically, both tables are merged and then sorted in an alphabetic order by the file name. In such a way, if a file did not change between the backups, then there are two identical entries in the table side-by-side (they only differ by their backup_ids). In a similar way, an embodiment determines which files got modified, or deleted, or newly introduced to the system.

For each full consecutive backup, a set of metrics is created that reflects the quantitative differences and dynamics of the system over time (the same characterization is used for large file subgroups of interest: office files, text files, PowerPoint files, executables, etc.). Example metrics include, but are not limited to, the following:

Total—the overall number of files $N_t$ and their aggregate size $S_t$;
Cold—the number of unchanged (cold) files $N_c$ and their aggregate size $S_c$;
Modified—the number of modified file $N_m$ and their aggregate size $S_m$;
New—the number of newly added files $N_n$ and their aggregate size $S_n$;
Deleted—the number of deleted files $N_d$ and their aggregate size $S_d$.

This set of metrics serves as a filesystem signature. It represents the system size, both the number of files and their storage requirements, and efficiently reflects the system dynamics over time. The introduced filesystem signature presents the fraction of the files that are stable and do not change between the backups, as well as the churn in the system which is characterized by the percentage of files that are modified, added, or deleted in the system. This data collected over time is used in a regression model for trending analysis.

Instead of keeping multiple copies of file metadata in different backup snapshots, a compact summary is created that is representative of the overall filesystem and all its files over time. The summary contains the latest file metadata (for each file) and a set of additional fields that represent file dynamics. Example summary contents include, but are not limited to, the following:

introduction date—the backup_id or the earliest snapshot that has the file;
counter of modifications over time—this counter is set to 0 when a file is introduced to the system, and gets increased each time a modification to the earlier recorded metadata is observed;
modification date—the backup_id that corresponds to the last modification date (initialized to empty);
deletion date—the backup_id that corresponds to the date when the files were deleted (initialized to empty).

This filesystem metadata summary is compacted and detailed at the same time: it uniquely characterizes the filesystem history and evolution over time.

One example embodiment implemented a prototype of a filesystem metadata analysis module on the top of Hewlett-Packard's Data Protector 6.0 toll. Using seven backup servers, a detailed metadata and trend analysis of the backed up filesystem were performed over 1.5 years. There were 570 objects or filesystems in the set that were classified into one of the following three groups:

(1) Small objects: with less than 5,000 flies. Typically (but not always), the small objects are system files. The object size (in bytes) in this category is diverse: from 20 KB to 587 GB. This shows the utility of having both dimensions in the filesystem characterization: number of files and their storage requirements.
(2) Medium objects: with more than 5,000 files but less than 100,000 files. The objects size in this group was in a broad range from 202 MB to 1.2 TB.
(3) Large objects: with more than 100,000 files. The largest object in the set had 4.5 million files. The object size in this category was in a range 665 MB-750 GB.

FIG. 1 shows a table 100 that summarizes the object characterization in the analyzed collection. The table includes three object types (small, medium, and large) and values in respective columns for "% of All the Objects" in a first column, "% of All the Files" in a second column, and "% of All the Bytes" in a third column.

While each object group constitutes about one third of the overall collection, the impact of the large objects is clearly dominant: the large objects are responsible for 93.2% of all the files and 66% of all the bytes in the collection.

When we compared weekly (full) backups aiming to characterize dynamics of the collection under study, we found that almost 50% of all the objects did not change between the backups. For the remaining objects the modifications are relatively small: for 95% of the objects the cold files are dominant and they constitute 90-99% of the files and the rates of modified and newly added files are in the range 1-10%. By grouping the filesystems in cold, slow-changing, and dynamic collections, one can optimize how often full versus incremental backups are performed for different type collections.

Figure 2A:
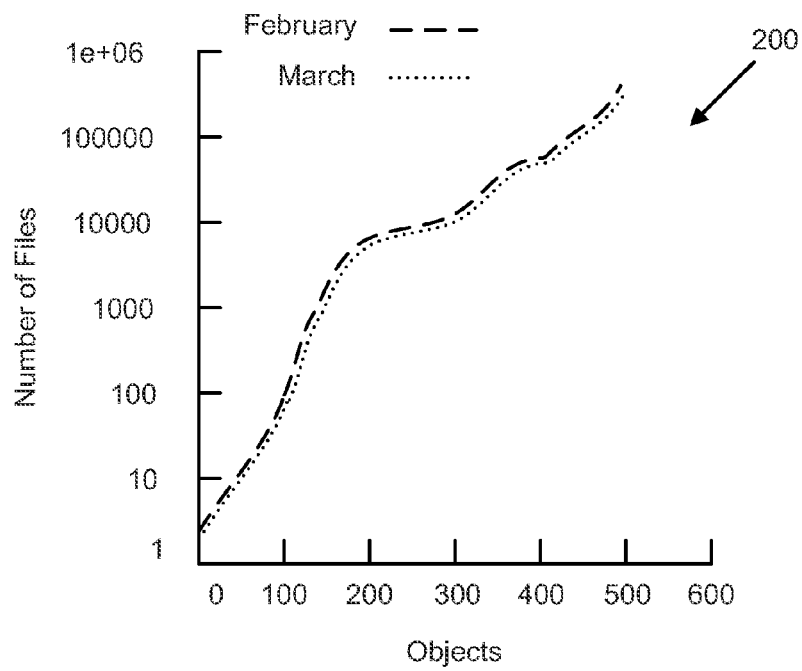
FIG. 2A shows a graph of profiles of filesystems backed-up over time in accordance with an example embodiment of the present invention.

FIG. 2A shows a graph 200 of profiles of filesystems backed-up over time. More specifically, the graph shows the profiles of the analyzed 570 objects over time. There are two lines in the figure: first line represents the object profile in the beginning of February, while the second line reflects the March profile. The graph 200 shows the number of files per object (sorted in increasing order) on a logarithmic scale.

Figure 2B:
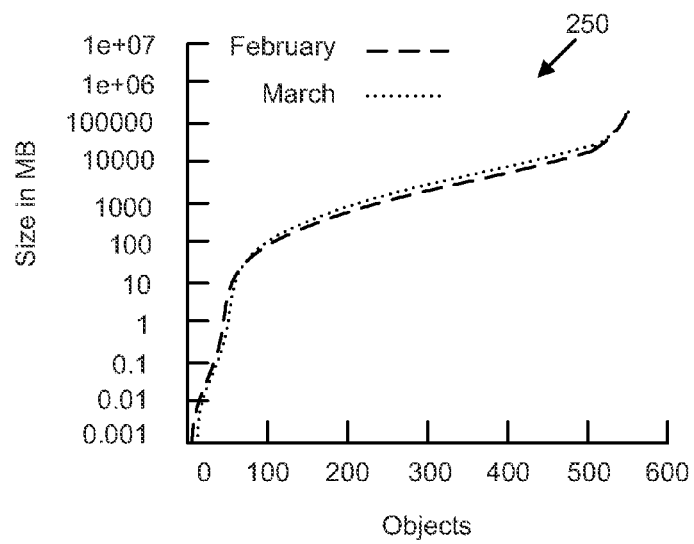
FIG. 2B shows another graph of profiles of the filesystems backed-up over time in accordance with an example embodiment of the present invention.

FIG. 2B shows another graph 250 of profiles of the filesystems backed-up over time. More specifically, the graph shows the size of the objects in MBytes (sorted in increasing order) on a logarithmic scale. Both lines are close and reflect a gradual change in the studied file collection over time.

The results of the workload analysis address a broader spectrum of performance and data management optimizations. The automated analysis of the filesystem "life span" (e.g., identifying filesystems and information sources that became "cold") is useful for automated file migration in multi-tier storage systems. The analyzed file metadata and their summaries provide useful views about managed enterprise information assets, their dynamics and trends based on available file attributes and organization structure.

Discussion of Backup Tool Performance Inefficiencies

Figure 3:
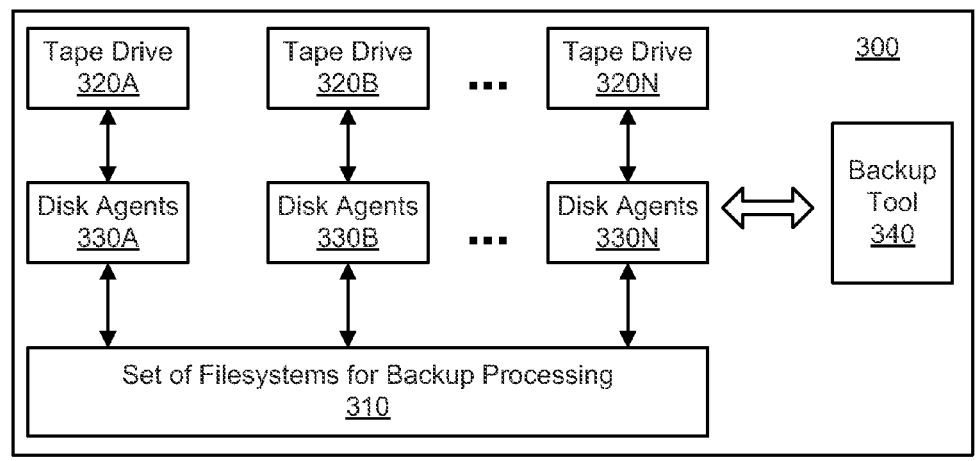
FIG. 3 shows a tape library backing up filesystems to tape drives in accordance with an example embodiment of the present invention.

The functionality of a backup tool is built around a backup session and the objects (mount points or filesystems of the client machines) that are backed up during the session. FIG. 3 shows a tape library 300 using a backup tool or software application 340. The library includes a set of objects or filesystems 310 being backed-up to storage devices, such as tape drives (shown as 320A, 320B, to 320N) using multiple disk agents (shown as 330A, 330B, to 330N). A backup tool 340 manages the backup of the filesystems to the tape drives.

For illustration, assume there are 4 of 6 tape drives (each solution comes with a fixed number of tape drives; it is not a parameter). Each such tape drive has a configuration parameter that defines a concurrency level (i.e., a number of concurrent processes called disk agents) that backs up different objects in parallel to the tape drives. Traditionally, this is performed because a single data stream generated by a disk agent copying data from a single object cannot fully utilize the capacity/bandwidth of the backup tape drive due to slow client machines. To optimize the total backup throughput, a system administrator can configure up to 32 disk agents for each tape drive to enable concurrent data streams from different objects at the same time. The drawback of such an approach is that the data streams from 32 different objects are interleaved on the tape. When the data of a particular object is requested to be restored, there is a higher restoration time for retrieving such data compared with a continuous, non-interleaved data stream written by a single disk agent.

When a group of N objects is assigned to be processed by the backup tool, a sequence or order cannot be defined in which these objects are processed by the tool. Typically, any available disk agent is assigned for processing to any object from the set, and the objects (which might represent different mount points of the same client machine) is written to different tape drives. Thus, traditionally, a way does not exist to define an order in which the objects are processed by concurrent disk agents to the different tape drives. Potentially, this may lead to inefficient backup processing and an increased backup time.

Figure 4A:
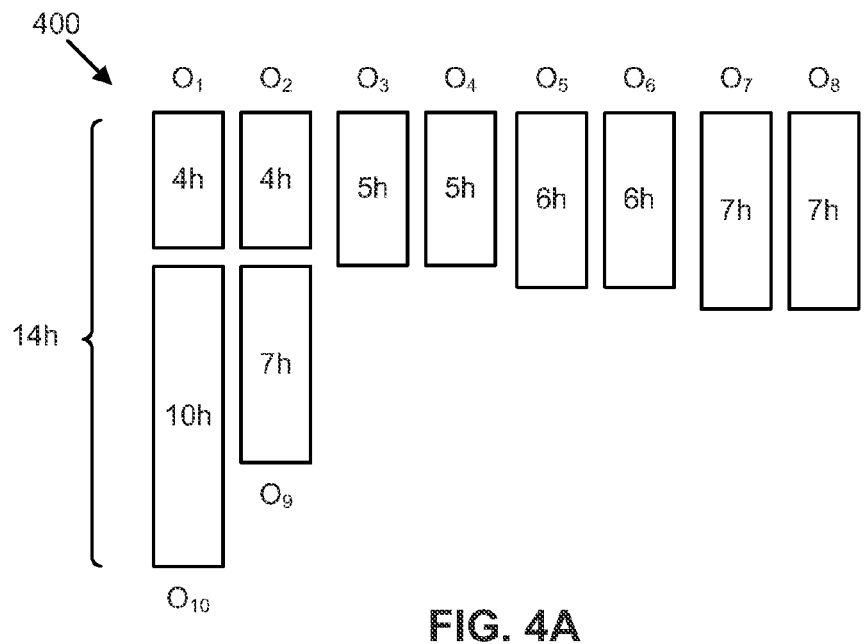
FIG. 4A shows blocks of backup times for filesystems with random scheduling in accordance with an example embodiment of the present invention.

The following scenario illustrates this inefficiency. Let there be ten objects $O_1, O_2, \ldots, O_{10}$, in a backup set, and let the backup tool have four tape drives each configured with 2 concurrent disk agents (i.e., with eight disk agents in the system). Let these objects take approximately the following times for their backup processing: $T_1=T_2=4$ hours, $T_3=T_4=5$ hours, $T_5=T_6=6$ hours, $T_7=T_8=T_9=7$ hours, and $T_{10}=10$ hours. If the disk agents randomly select the following eight objects, $O_1, O_2, O_3, \ldots, O_7, O_8$, for initial backup processing then objects $O_9$ and $O_{10}$ will be processed after the backup of $O_1$ and $O_2$ are completed (since backup of $O_1$ and $O_2$ take the shortest time of 4 hours), and the disk agents which became available will then process $O_9$ and $O_{10}$. In this case, the overall backup time for the entire group will be 14 hours. FIG. 4A shows blocks of backup times 400 for filesystems or objects with random scheduling in accordance with this scenario.

Figure 4B:
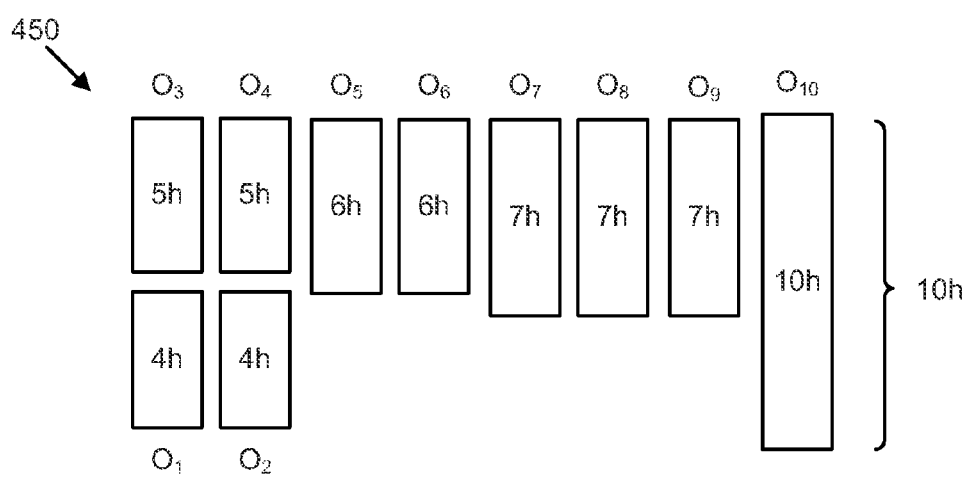
FIG. 4B shows blocks of backup times for filesystems with optimized scheduling in accordance with an example embodiment of the present invention.

The optimal scheduling for this group is to process the following eight objects instead: $O_3, O_4, \ldots, O_{10}$ first, and when processing of $O_3$ and $O_4$ is completed after 5 hours, the corresponding disk agents will backup the remaining objects $O_1$ and $O_2$. If the object processing follows this new ordering schema then the overall backup time is 10 hours for the entire group. FIG. 4B shows blocks of backup times 450 for filesystems with optimized scheduling using LBF.

While above scenario demonstrates the backup tool behaving inefficiently with a simple example, the traditional enterprise environment might have hundreds of objects for backup processing. Hence, one embodiment automates the object scheduling process. As discussed more fully below, one embodiment includes an additional job scheduler in the backup solution which aims to optimize the overall backup time and helps to avoid manual configuration efforts by system administrators who try to achieve the same performance goal.

LBF Scheduling to Optimize and Reduce Backup Time

Example embodiments are applicable to both full backups (i.e., when the data of the entire object is processed during a backup) and incremental backups (i.e., when less than the entire object is processed, such as modified and newly added files from the object). For discussion purposes, however, embodiments are further described for a full backup.

For each backed up object, there is recorded information on the number of processed files, the total number of transferred bytes, and the elapsed backup processing time. One embodiment uses historic information on duration for processing of backup jobs (the jobs which were successfully completed).

Some issues to consider are whether past measurements of backup processing time are good predictors of the future processing time, and whether such measurements can be used for backup job assignment and scheduling processes. Our historic data analysis shows that while different objects might have different backup processing times, the processing time of the same object is quite stable over time because of gradual changes in the object size.

LBF Scheduling Algorithm

Figure 5:
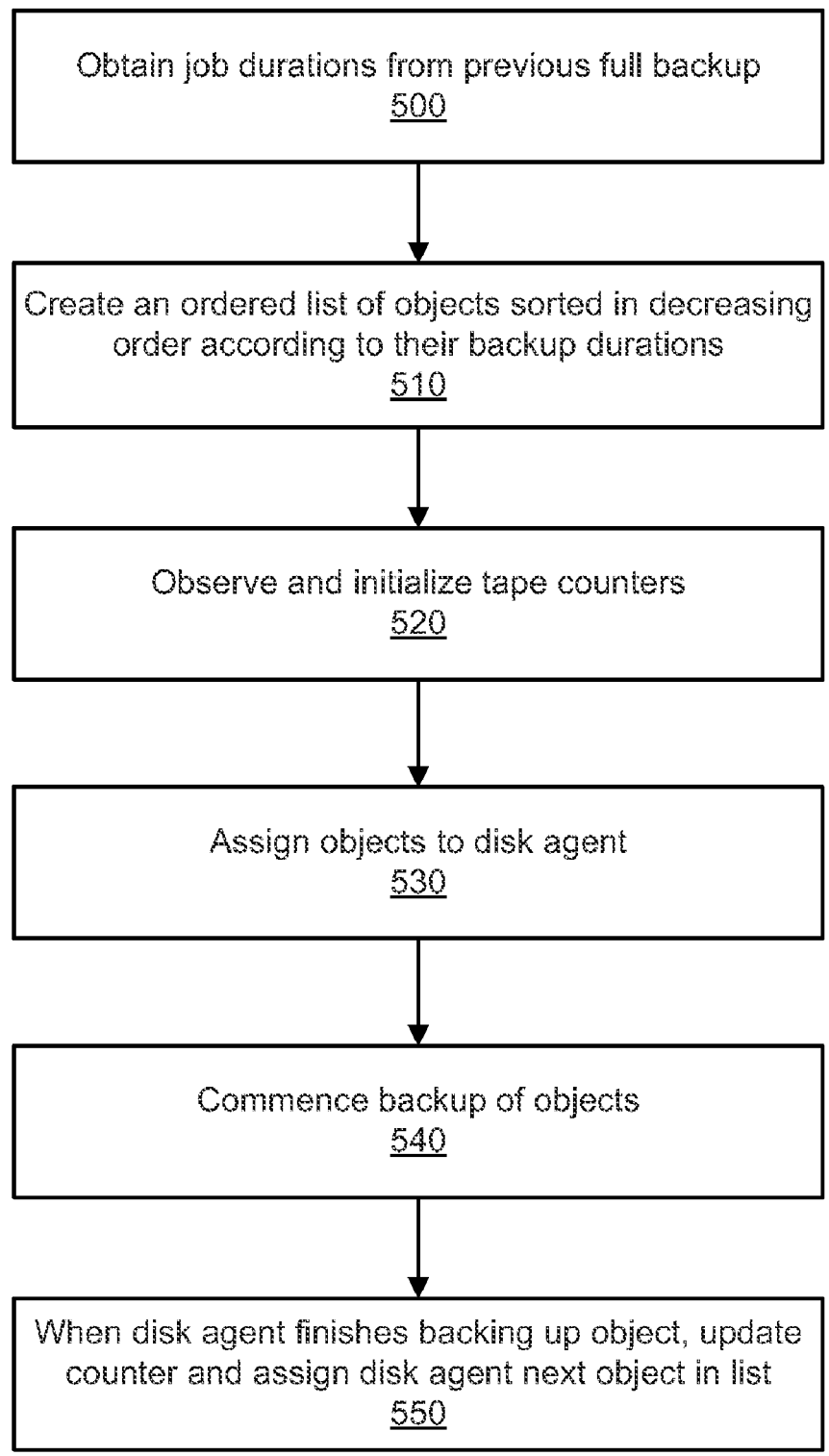
FIG. 5 shows an LBF algorithm for scheduling and performing backup of objects in accordance with an example embodiment of the present invention.

FIG. 5 shows an LBF algorithm for scheduling backup of objects.

According to block 500, for an upcoming full backup, one embodiment obtains information about the job durations from one or more previous or historic full backups. For example, one embodiment obtains previous times required to backup one or more objects or filesystems to a storage device, such as a tape drive.

According to block 510, an ordered list of objects sorted in decreasing order of their backup durations is created or gen erated. By way of example, this ordered list of objects is created as follows:

OrderedObjectList={$(Ob_1,Dur_1), \ldots, (Ob_n,Dur_n)$} where $Dur_j$ denotes the backup duration of object $Ob_j$, and $Dur_1 \geq Dur_2 \geq Dur_3 \geq \ldots \geq Dur_n$.

According to block 520, the tape counters and/or drives are observed and initialized. For example, let there be N tape drives: $Tape_1, \ldots, Tape_N$, and each tape drive is configured with k disk agents. We observe the following running counters per each tape drive $Tape_i$:

$DiskAgent_i$—a counter of available (not busy) disk agents of tape drive $Tape_i$; and $TapeProcTime_i$—a counter of overall processing time assigned to tape drive $Tape_i$.

For each tape drive $Tape_i$ ($1 \leq i \leq N$) these counters are initialized as follows:

$DiskAgent_i = k$ $TapeProcTime_i = 0$.

Now, we describe the iteration step of the algorithm. Let $(Ob_j, Dur_j)$ be the top object in the OrderedObjectList, and let $$TapeProcTime_m = \min_{1 \leq i \leq N \& DiskAgent_i > 0} (TapeProcTime_i),$$

i.e., the tape drive $Tape_m$ has the smallest assigned processing time, and it still has an available disk agent that can process the object $Ob_j$.

According to block 530, objects are assigned to a disk agent. For example, object $Ob_j$ is assigned for processing to the available disk agent at the tape drive $Tape_m$, and the running counters of this tape drive are updated as follows:

$TapeProcTime_m \Leftarrow TapeProcTime_m + Dur_j$ $DiskAgent_m \Leftarrow DiskAgent_m - 1$.

This algorithm assigns the longest jobs to be processed first. For example, one embodiment assigns agents based on a priority in which objects having a longest job duration (i.e., longest time to complete backup operation from start to finish) are assigned and executed first. Objects having a shortest job duration (i.e., shortest time to complete backup operation from start to finish) are assigned and executed last. The priority thus executes backup operations based on a hierarchy of time required to backup the object of filesystem. Further, in one embodiment, the job assignment to concurrent disk agents is performed to balance the overall amount of processing time assigned to different tape drives.

According to block 540, once the disk agents are assigned some objects, the backup processing can start.

According to block 550, when disk agent finishes backing up object, the counter is updated, and the disk agent is assigned the next object in list. For example, when a disk agent at a tape drive $Tape_m$ completes the backup of the assigned object, the running counter of this tape drive is updated as follows:

$DiskAgent_m \Leftarrow DiskAgent_m + 1$.

Then the disk agent of this tape drive is assigned the next available object from the OrderedObjectList, and the running counters are updated again, and the backup process continues.

In a performance study, historic information on the duration of backup jobs was collected from the seven backup servers. FIG. 6 is a table 600 that shows the absolute and relative reduction of the overall backup times when the proposed scheduling algorithm is used. As shown in table 600, a reduction in backup time is achieved across all the seven backup servers when using the job scheduling algorithm of FIG. 5. The absolute time savings range from 39 min to 212 min.

Creating Balanced Backup Groups with BBG Algorithm

Figure 7:
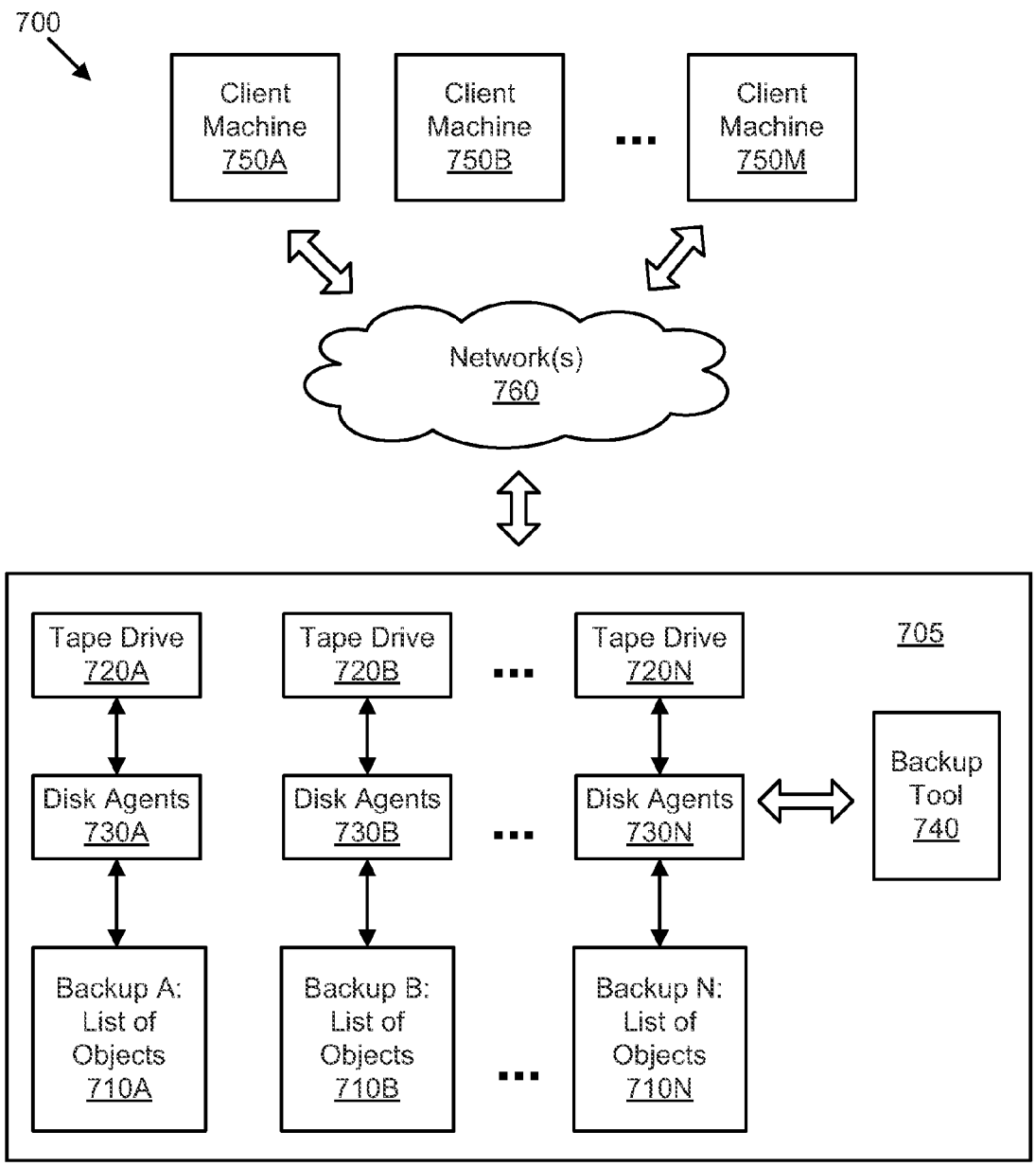
FIG. 7 shows a storage system with a tape library with groups of filesystems being assigned for backup to tape drives in accordance with an example embodiment of the present invention.

FIG. 7 shows a storage system 700 that includes a tape library 705 with groups of filesystems being assigned for backup to storage devices, such as tape drives. The library 705 includes a set of objects or filesystems (shown as 710A, 710B, to 710N) being backed-up to storage devices, such as tape drives (shown as 720A, 720B, to 720N) using multiple disk agents (shown as 730A, 730B, to 730N). A backup tool 740 manages the backup of the filesystems to the tape drives. A plurality of client machines, hosts, or servers (shown as 750A, 750B, to 750M) communicates with the library 705 through one or more networks 760.

Under a traditional approach, when a group of N objects is assigned for backup processing, a way does not exist to define a sequence or order in which these objects are processed by the backup tool. Typically, any available disk agent is assigned for processing to any object from the set. Further, the objects that represent different mount points of the same client machine might be written to different tapes. This situation can even occur for smaller client machines when the backed up client data are spread across multiple tapes.

One option is to manually create the backup groups, which are assigned to different tape drives for processing in order to control the number of tapes that are used per server. For example, a system administrator can designate or assign the list of objects in group A (710A) to tape drive 720A, the list of objects in group B (710B) to tape drive 720B, etc. Here, each group is assigned a single tape drive.

This approach of assigning and backing up groups of objects to single tape drives is efficient when the created groups are well balanced and take approximately the same time for processing. Even if manually created groups are well balanced, however, a method does not exist to define an order in which the objects are processed within the groups by concurrent disk agents. Potentially, this approach still leads to an inefficient backup processing and an increased backup time.

One embodiment automates the process of assigning and backing up groups of objects to tapes drives by using an algorithm (referred herein as BBG). The BBG algorithm uses historic information about the backup time of different objects representing different mount points of the same client machines. This helps to avoid manual configuration efforts by system administrators trying to achieve efficient backup and retrieval of data.

BBG Algorithm

Figure 8:
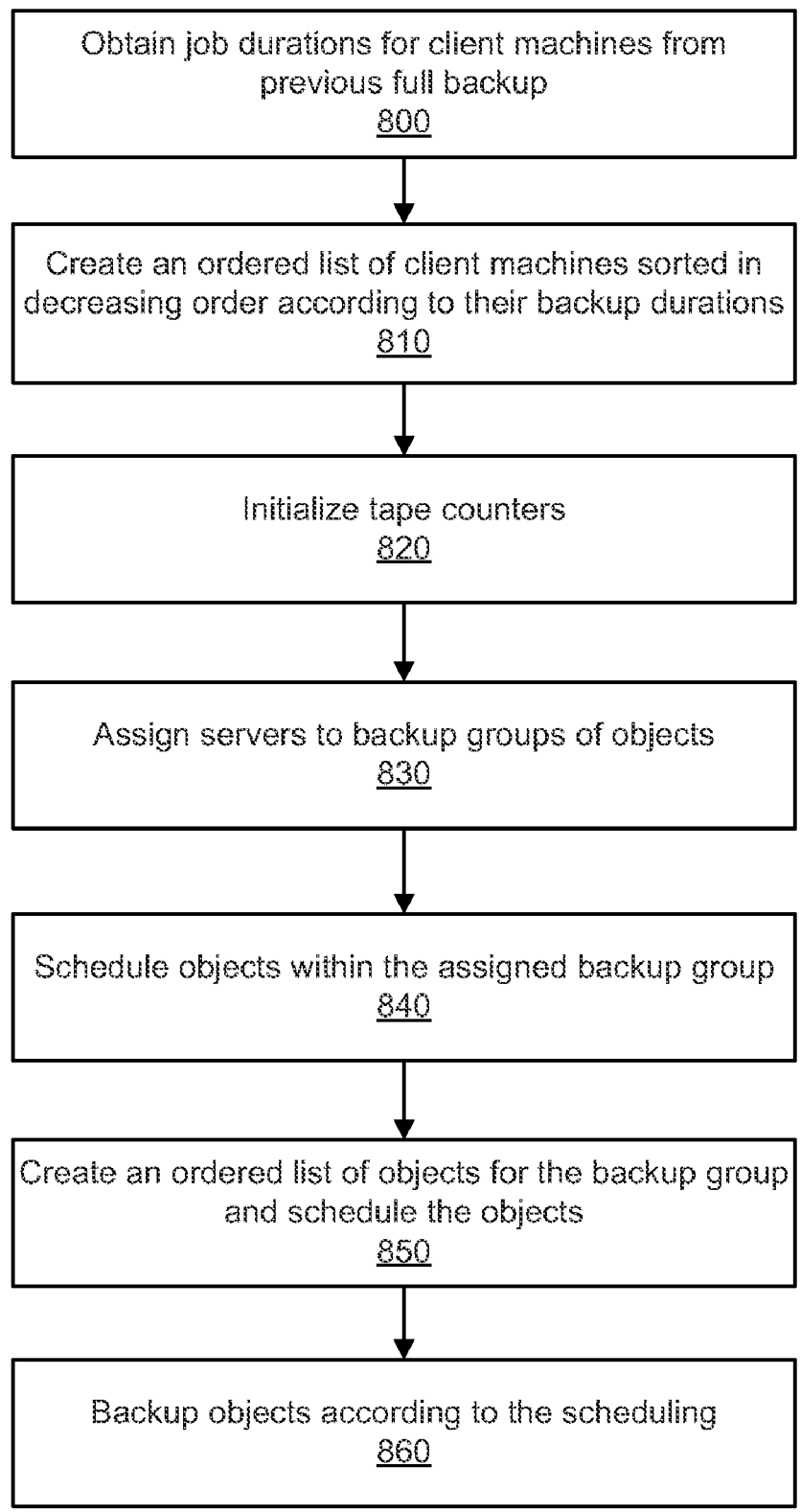
FIG. 8 shows a method of assigning and backing up groups of objects to storage devices in accordance with an example embodiment of the present invention.

FIG. 8 shows a method of assigning and backing up groups of objects to storage devices (for illustration, the method described as BBG algorithm). According to block 800, job durations from client machines from previous or historical backups is obtained.

According to block 810, an ordered list of client machines (each might have multiple objects for backup processing) is created and sorted in decreasing order according their backup durations from a previous full backup. For example, an ordered server list is as follows:

OrderedServerList={$(S_1,Dur_1), \ldots, (S_n,Dur_n)$} where $Dur_r$ denotes the backup duration of client server $S_r$, and $Dur_1 \geq Dur_2 \geq Dur_3 \geq \ldots \geq Dur_n$.

Note, that if server $S_r$ is comprised of multiple objects $(Ob_r^j, Dur_r^j (1 \leq j \leq M_r))$ then $$Dur_r = \sum_{1 \leq j \leq M_r} Dur_r^j$$

According to block 820, one or more counters are initialized. For example, let there be N tape drives: $Tape_1$, $Tape_2, \ldots, Tape_N$. Further, let $TapeProcTime_j$ be a running counter of the overall processing time assigned to tape drive $Tape_i$ ($1 \leq i \leq N$).

According to block 830, the servers are assigned to backup groups of objects or filesystems. For example, the server assignment to different backup groups is defined by the following iteration step of the algorithm.

Let $(S_r, Dur_r)$ be the top server In the OrderedServerList, and let $$TapeProcTime_m = \min_{1 \leq j \leq M_r} (TapeProcTime_i),$$

i.e., tape drive $Tape_m$ has the smallest assigned processing time. Then $S_r$ is assigned for processing to the backup group at the tape drive $Tape_m$, and the running counter of this tape drive is updated as follows:

$TapeProcTime_m \Leftarrow TapeProcTime_m + Dur_r$.

After that the next server from the ordered list OrderedServerList is considered for the assignment.

According to block 840, objects are scheduled within the assigned backup group. For example, after all the servers from the list are assigned to backup groups, there is a second stage of the algorithm for object scheduling within the created backup groups.

According to block 850, to avoid processing inefficiency within the backup group, the algorithm creates an ordered list of objects for this backup group (sorted in decreasing order of their job durations) and schedules them in a similar way as described in connection with FIG. 5.

According to block 860, the objects are backed up according to the schedule.

The method of FIG. 8 automates the creation of balanced backup groups to limit the number of tapes the client data are written to, while also achieving a backup time reduction. The algorithm divides the filesystems into backup groups such that each of the backup groups takes approximately a same amount of time to backup to the storage device. By simultaneously backing up the filesystems in the backup groups to the storage device with the agents, optimization is achieved through a reduced backup time. One embodiment thus reduces a number of tapes used to backup the filesystems by balancing the backup groups such that each group completes backup operations at approximately a same time.

One embodiment computes average backup times over a period of time (for example, weeks or months) from previous backups of the filesystems. For example, the backup times for a filesystem are divided by the total number of backups to determine an average. This average is then used to represent the backup duration for a current backup and assign priority to the agents for backing up the filesystem.

Figure 9:
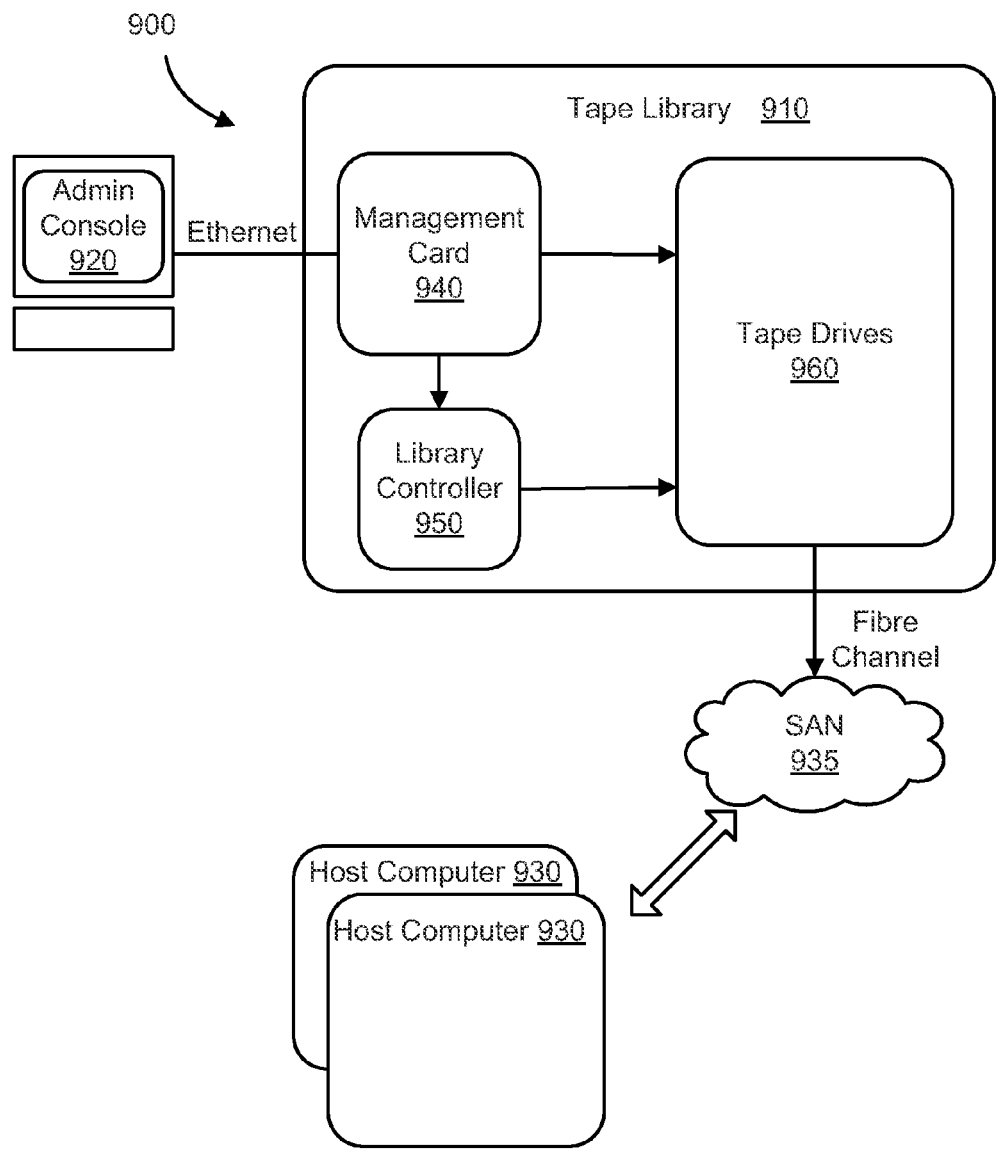
FIG. 9 shows an exemplary storage system in accordance with an example embodiment.

FIG. 9 is an exemplary storage system 900 in accordance with an example embodiment. The storage system includes a tape library 910 connected to an administrative console 920 and one or more host computers 930 via one or more networks (for example, shown as a storage area network 935 or SAN).

The tape library 910 includes a management card 940 coupled to a library controller 950 and one or more tape drives 960. In one embodiment, the administrative console 920 enables a user or administrator to select and/or administer backup of data according to example embodiments discussed herein. The library controller is used to execute one or more methods and/or algorithms according to example embodiments discussed herein.

Embodiments in accordance with the present invention are utilized in a variety of systems, methods, and apparatus. For illustration, example embodiments are discussed in connection with a tape library. Example embodiments, however, are applicable to other types of storage systems, such as storage devices using cartridges, hard disk drives, optical disks, or movable media. Furthermore, method disclosed herein can be executed by a processor, a controller, a server, a storage device, a computer, or other type of computing device.

DEFINITIONS

As used herein and in the claims, the following words are defined as follows:

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM, drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a storage device, comprising:
    obtaining historic job durations to back up data to a storage device;
    ordering, based on the job durations, objects to be backed up to multiple drives in the storage device;
    assigning the objects to agents based on priorities that first back up an object having a longest job duration;
    backing up the objects with the agents to the multiple drives according to the priorities;
    updating a counter when an agent completes backing up an object; and
    assigning the agent a next object having a longest job duration that is not yet backed up.

2. The method of claim 1, wherein the storage device is a tape library and the multiples drives are tape drives in the tape library.

3. The method of claim 1 further comprising, ordering the objects in a list according to how long an object will take to backup to the drives.

4. The method of claim 1 further comprising, creating a list of the objects in which the objects having a longer scheduled backup time to the storage device are listed before objects having a shorter scheduled backup time to the storage device.

5. The method of claim 1, wherein the historic job durations include, for each object to be backed up, a total number of transferred bytes and elapsed backup processing time.

6. A tangible, non-transitory computer readable storage medium having instructions for causing a computer to execute a method, comprising:
    obtaining, from historic data, times to previously backup filesystems to a storage device;
    ordering, based on the times, the filesystems according to a schedule that backs up a filesystem having a longer previous backup time before a filesystem having a shorter previous backup time;
    assigning the filesystems to agents that backup the filesystems to drives in the storage device;
    backing up the filesystems with the agents to the drives according to the schedule; and
    creating the historic data from snapshots of metadata of the filesystems being backed up.

7. The tangible, non-transitory computer readable storage medium of claim 6 further comprising:
    dividing the filesystems into backup groups such that each of the backup groups takes approximately a same amount of time to backup to the storage device;
    simultaneously backing up the filesystems in the backup groups to the storage device with the agents.

8. The tangible, non-transitory computer readable storage medium of claim 6 further comprising:
    dividing the filesystems into backup groups;
    reducing a number of tapes used to backup the filesystems by balancing the backup groups such that each group completes backup operations at approximately a same time.

9. The tangible, non-transitory computer readable storage medium of claim 6, wherein the storage device is a tape library and the drives are tape drives in the tape library.

10. The tangible, non-transitory computer readable storage medium of claim 6 wherein the metadata includes size, date, time, and file name.

11. The tangible, non-transitory computer readable storage medium of claim 6 further comprising, tracking metadata from previous backups of the filesystems to determine from historical data which filesystems changed during the previous backups.

12. The tangible, non-transitory computer readable storage medium of claim 6 further comprising:
    completing, by an agent, a backup of a filesystem to a tape drive;
    assigning the agent to a next filesystem in the schedule.

13. A tape library, comprising:
    a plurality of tape drives; and
    a controller that executes a backup algorithm to:
        obtain times to previously backup filesystems to the tape library;
        order, based on the times, the filesystems according to a list that backs up a filesystem having a longer previous backup time before a filesystem having a shorter previous backup time;
        assign the filesystems to agents that backup the filesystems to the tape drives according to the list;
        update a counter when an agent completes backing up a filesystem; and
        assign the agent a next filesystem having a longest job duration that is not yet backed up.

14. The tape library of claim 13, wherein the controller reduces an overall time to backup the filesystems by backing up the filesystem with the longer previous backup time before the filesystem having the shorter previous backup time.

15. The tape library of claim 14, wherein the controller executes the backup algorithm such that filesystems having a longer historical backup time are provided a higher priority to backup than filesystems having a shorter historical backup time.

16. The tape library of claim 14, wherein the list orders the filesystems according to how long a filesystem will take to backup to the tape library.

17. The tape library of claim 14, wherein the list is based on historic data from previous backups of the filesystems, and the historic data includes a total number of transferred bytes and elapsed backup processing time for each of the filesystems.

18. The tape library of claim 14, wherein the controller further executes the backup algorithm to:
    compute average backup times over a period of time from the times to previously backup the filesystems;
    use the average backup times to assign priority to the filesystems for backing up with the agents.

19. The tape library of claim 14, wherein the controller further executes the backup algorithm to balance backup load to the tape drives by dividing the filesystems into backup groups that assigned to individual ones of the tape drives.

* * * * *